United States Patent
Thompson et al.

(10) Patent No.: US 8,621,858 B2
(45) Date of Patent: Jan. 7, 2014

(54) HYDRAULIC CIRCUIT FOR A REGENERATIVE DRIVE ASSEMBLY

(75) Inventors: John Graham Thompson, Beechworth (AU); Christopher Scott Marshall, The Hill (AU)

(73) Assignee: Permo-Drive Technologies Ltd, South Lismore, New South Wales (AU)

( * ) Notice: Subject to any disclaimer, the term of this patent is extended or adjusted under 35 U.S.C. 154(b) by 923 days.

(21) Appl. No.: 12/523,692

(22) PCT Filed: Jan. 10, 2008

(86) PCT No.: PCT/AU2008/000020
§ 371 (c)(1),
(2), (4) Date: Jan. 28, 2010

(87) PCT Pub. No.: WO2008/086561
PCT Pub. Date: Jul. 24, 2008

(65) Prior Publication Data
US 2010/0170237 A1   Jul. 8, 2010

(30) Foreign Application Priority Data
Jan. 19, 2007   (AU) ................................ 2007900274

(51) Int. Cl.
*B60K 6/12* (2006.01)
(52) U.S. Cl.
USPC .............................................. 60/418; 60/420

(58) Field of Classification Search
USPC ............................................ 60/414, 418, 420
See application file for complete search history.

(56) References Cited

U.S. PATENT DOCUMENTS

| 4,187,739 A | 2/1980 | Hamma et al. |
| 4,372,414 A * | 2/1983 | Anderson et al. ................ 60/418 |
| 5,088,041 A * | 2/1992 | Tanaka et al. .................. 180/165 |
| 7,381,150 B2 * | 6/2008 | Marshall et al. ............... 477/115 |

FOREIGN PATENT DOCUMENTS

| CA | 02417313 A1 | 7/2003 |
| EP | 0 366 087 B1 | 1/1994 |
| GB | 159098 | 3/1920 |
| GB | 2 415 669 A | 1/2006 |
| JP | 11-344115 A | 12/1999 |
| WO | WO 2006/017901 A1 | 2/2006 |

* cited by examiner

*Primary Examiner* — Thomas E Lazo

(74) *Attorney, Agent, or Firm* — Kilpatrick Townsend & Stockton LLP

(57) ABSTRACT

An assembly (10) forming part of a regenerative drive system for a motor lorry. The motor lorry has a driven train that is operatively associated with the assembly (10) so as to cause operation of the assembly (10) to store energy, or alternatively to be driven by the assembly (10) by depletion of energy stored by the assembly (10). The assembly (10) includes a variable angled swash plate pump/motor (11) that is drivingly associated with the drive train and the motor lorry. The assembly (10) includes a clutch (13) that is engaged when the motor lorry is de-accelerating, to cause the pump/motor (11) to be driven.

3 Claims, 5 Drawing Sheets

HYDRAULIC CIRCUIT FOR A REGENERATIVE DRIVE ASSEMBLY

CROSS REFERENCE TO RELATED APPLICATIONS

This application is a National Stage of International Application No. PCT/AU2008/000020 filed Jan. 10, 2008 and which claims the benefit of Australian Patent Application No. 2007900274, the disclosures of all applications being incorporated herein by reference.

TECHNICAL FIELD

The present invention relates to a variable angle plate pump/motor and the associated hydraulic circuits and more particularly but not exclusively to such a pump/motor and its hydraulic circuit when used in a regenerative drive system for a motor vehicle such as a motor lorry.

BACKGROUND OF THE INVENTION

Described in International Patent Applications PCT/AU2005/001241, PCT/AU2006/001426, PCT/AU2003/001235, PCT/AU2003/001238, PCT/AU2003/001236, PCT/AU2003/001237, PCT/AU2003/000757, PCT/AU2003/001237, PCT/AU2003/00040, PCT/AU2003/00042 and PCT/AU2003/00041 are regenerative drive systems, including pumps/motors, electrical and hydraulic control systems, particularly adapted for motor lorries for the purposes of recovering energy that would be normally dissipated when a motor lorry is deaccelerating.

In the above International application PCT/AU2006/001426 there is described a variable angle swash plate pump/motor and an associated hydraulic circuit to be used in a regenerative drive system for a motor vehicle such as a motor lorry. Hydraulic fluid under pressure is generated internally of the pump/motor to vary the angle of the swash plate. The pump/motor is operatively associated with the main drive train of the motor lorry via a clutch. When the clutch is disengaged, the pump/motor is held in a pumping mode so that when the clutch is engaged it will generate pressure enabling operation of the swash plate. This takes time and represents a substantial loss of energy that could be captured. It must be kept in mind that the clutch is engaged at the very start of a cycle, a time at which maximum energy should be captured.

A still further problem in respect of the above discussed pump/motor is that it must be adapted to revert to a pumping mode when not being driven. This adds to the complexity of the pump/motor and can limit the range of available pump/motors.

OBJECT OF THE INVENTION

It is the object of the present invention to overcome or substantially ameliorate at least one of the above disadvantages.

SUMMARY OF THE INVENTION

There is disclosed herein in combination, a pump/motor having a variable capacity and a mechanism to change said capacity, and a hydraulic circuit to provide the pump/motor with hydraulic fluid under pressure to be used in controlling the mechanism, the circuit including:

a hydraulic line connected to the pump/motor to deliver the hydraulic fluid under pressure thereto;

an accumulator to receiving hydraulic fluid under pressure and connected to said line to provide said hydraulic fluid under pressure for delivery to the pump/motor;

a pump connected to the accumulator to deliver hydraulic fluid under pressure thereto;

a motor drivingly connected to the pump to drive the pump to produce the hydraulic fluid under pressure; and a switch operatively associated with the motor to activate the motor when said combination is operative and pressure in said line falls below a predetermined pressure.

Preferably, said pump/motor is a variable angle swash plate pump and said mechanism is a swash plate.

Preferably, said combination is part of a regenerative drive system for motor vehicle, said accumulator is a first accumulator, and said system includes a second accumulator, and wherein said second accumulator is connected to said pump/motor by a second hydraulic line, with communication between said first line and said second line so that pressure from said second line can be delivered to said first line.

Preferably, said combination includes a one-way valve preventing hydraulic fluid flowing from said first line to said second line.

Preferably, said combination further includes a drive assembly to be drivingly associated with a drive train of a motor vehicle, said drive assembly including:

a first member to be drivingly associated with the drive train;

a clutch operatively associated with the pump/motor and first member so that when engaged the first member is driven by or drives the pump/motor, while when disengaged the pump/motor and first member are drivingly isolated; and wherein said hydraulic circuit is operatively associated with said clutch to cause engagement and disengagement thereof.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
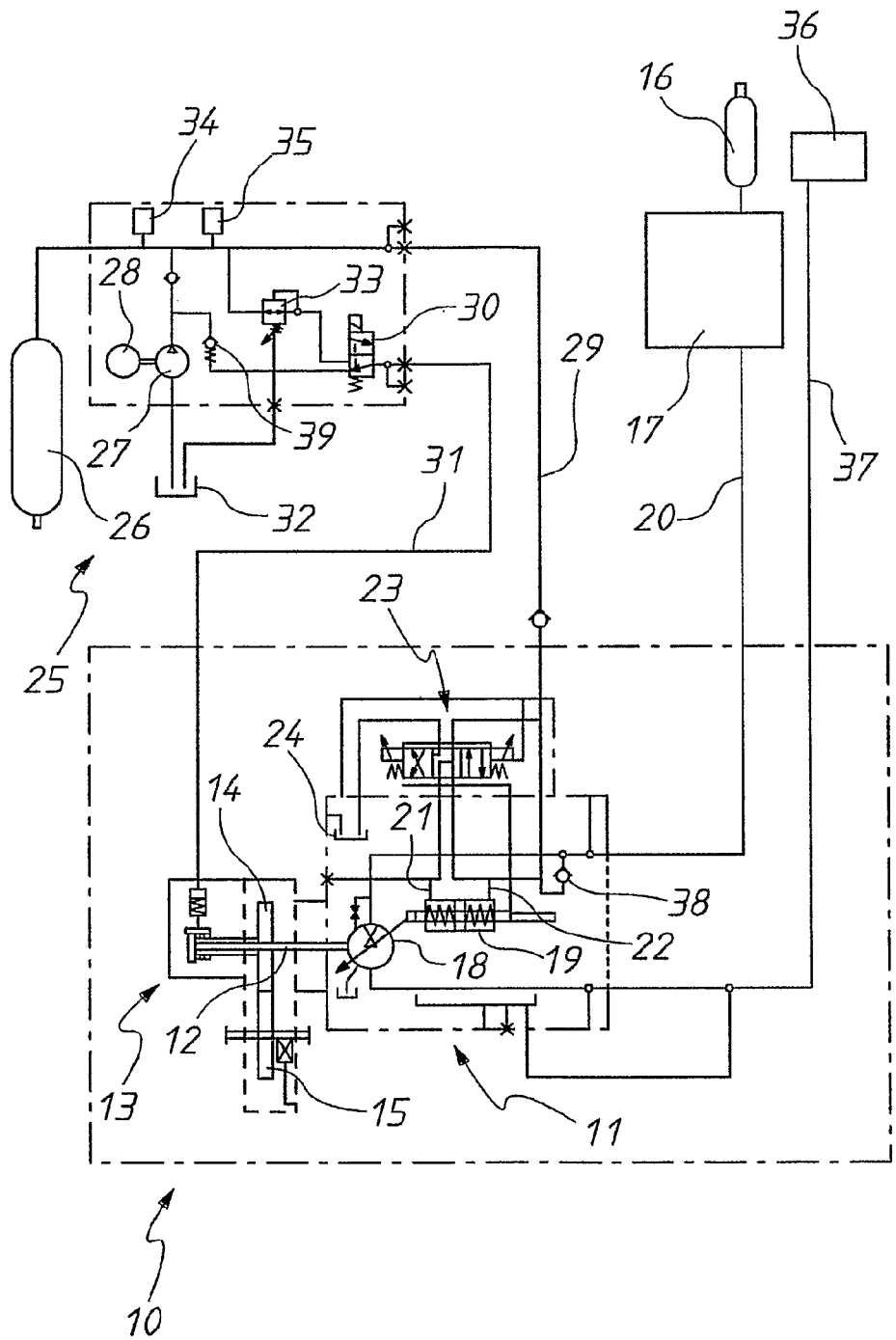
FIG. 1 is a schematic illustration of a hydraulic circuit including a pump/motor of a regenerative drive system of a motor lorry.

In the accompanying drawings there is schematically depicted an assembly 10 forming part of a regenerative drive system of a motor lorry. The motor lorry has a drive train that is operatively associated with the assembly 10 so as to cause operation of the assembly 10 to store energy, or alternatively to be driven by the assembly 10 by depletion of energy stored by the assembly 10.

The assembly 10 includes a variable angle swash plate pump/motor 11 from which there extends a shaft 12. The shaft 12 is coupled to a clutch 13, with the clutch 13 connecting the shaft 12 and a first gear (first driven member) 14. The gear 14 is meshingly engaged with a second gear (second driven member) 15. The gear 15 drives or is driven by the main drive train of the motor lorry.

When the motor lorry is de-accelerating, the clutch 13 is engaged so that the gear 15 drives the pump/motor 11. Driving of the pump/motor 11 charges a reservoir 16 via a hydraulic circuit 17, the hydraulic circuit 17 being more fully described in International patent application PCT/AU2006/001426. When the reservoir 16 is charged, the stored energy may be used to drive the motor lorry by the circuit 17 discharging hydraulic fluid under pressure stored in the reservoir 16 via the pump/motor 11, causing the pump/motor 11 to act as a motor and drive the shaft 12. The clutch 13 would be engaged so that the shaft 12 is drivingly associated with the gear 15 that in turn drives the main drive train of the motor lorry.

The pump/motor 11 includes a variable angle swash plate 18 that is moved by a hydraulic actuator 19. Operation of the actuator 19, by the delivery of hydraulic fluid under pressure thereto, causes the plate 18 to change in angle and therefore change the operative capacity of the pump/motor 11.

Assuming the reservoir 16 has sufficient hydraulic fluid under pressure, the circuit 17 can be operated to deliver hydraulic fluid under pressure to a hydraulic line 20 communicating with the actuator 19 to cause operation thereof.

More particularly the actuator 19 has a first port 21 and a second port 22. The line 20 delivers hydraulic fluid under pressure to the line 22 as well as a valve 23. The valve 23 is also connected to the port 21. By operation of the valve 23 pressure is varied between the ports 21 and 22 to change the angle of the plate 18 by operation of the actuator 19. In the configuration as shown in FIG. 1, both ports 21 and 22 are receiving hydraulic fluid under pressure so that the actuator 19 is essentially in a "central" position. In a second configuration, the valve 23 will deliver hydraulic fluid under pressure to the port 21 but vent port 22 to a tank 24. Accordingly the angle of the swash plate 18 will be changed by operation of the actuator 19. In a second configuration of the valve 23, the port 22 receives hydraulic fluid under pressure while the port 21 is vented to the tank 24. The angle of the plate 18 will change accordingly.

The assembly 10 also includes a hydraulic circuit 25 that includes a reservoir 26 that receives hydraulic fluid under pressure. The circuit 25 further includes a pump 27 and an electric motor 28 that drives the pump 27 to produce hydraulic fluid under pressure.

The circuit 25 has an hydraulic line 29 that is connected with the line 20 so as to deliver hydraulic fluid under pressure to the valve 23 by extending between the motor/pump 11 and the reservoir 26. The pump 27 is also connected to the line 29 so that when operated by the motor 28, hydraulic fluid under pressure is delivered to the reservoir 26 to charge the reservoir 26. The circuit 25 includes a spool valve 30 that is operated to deliver hydraulic fluid under pressure via a line 31 to the clutch 13, or alternatively to drain hydraulic fluid from the clutch 13 to a tank 32. Accordingly operation of the clutch 13 is controlled via the valve 30. Hydraulic fluid under pressure is delivered to the valve 30 via a pressure regulating valve 33.

A first pressure sensitive switch 34 (assuming the assembly 10 is operative) activates the motor 28 when pressure in the line 29 falls bellows a predetermined pressure. When the pressure exceeds a predetermined pressure, the pressure sensitive switch 35 turns the motor 28 off.

The valve 30 in a first configuration (as shown in the accompanying drawings) connects the clutch 13 with the tank 32 so that the clutch 13 is open and therefore drivingly disconnecting the shaft 12 and gear 15. In a second configuration the valve 30 disconnects the line 31 from the tank 32 and connects the reservoir 26 with the clutch 13 to cause operation of the clutch 13 to therefore drivingly disconnect the shaft 12 with respect to the gear 15.

The pump/motor 11 is also connected to a tank 36 via a line 37.

As also can be noted from FIG. 1, hydraulic fluid under pressure in the reservoir 16 cannot be used to charge the reservoir 26 due to the valve 40. The one-way valve 38 prevents flow from the line 29 to the line 20.

Figure 2:
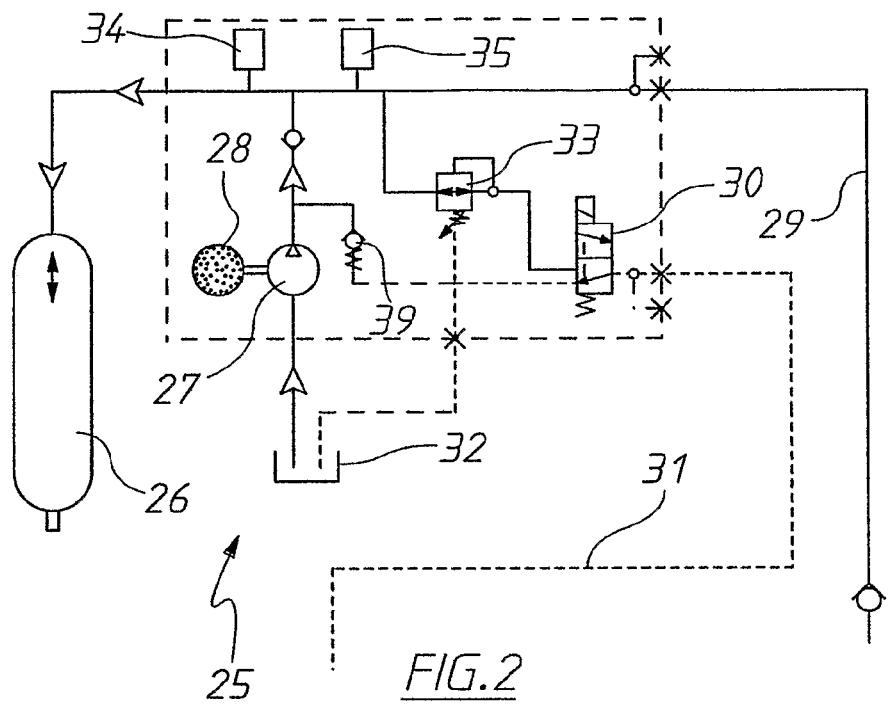
FIGS. 2 to 8 are schematic illustrations of portion of the hydraulic circuit of FIG. 1 in various modes of operation.

Start-Up (FIG. 2)

When the assembly 10 is first activated by an electronic control (such as that described in PCT/AU2005/001241), the control would sense that switch 34 is closed, that is there is low pressure in the line 29. The motor 28 would then be activated so that the pump 27 charges the reservoir 26. This will continue until the switch 35 detects that there is a maximum pressure in the line 29, thereby turning the motor 28 off. The switch 35 could also be replaced with a "timer" that would limit the time the motor 28 is operative. By way of a safety mechanism, a valve 39 is provided that would vent excess pressure to the tank 32 should the switch 35 fail. Accordingly the reservoir 26 is charged thereby enabling operation of the actuator 19 by operation of the valve 23. In that regard, it should be appreciate the valve 23 is electrically operated and again would be operatively associated with the control system described in International patent application PCT/AU2205/001241.

Figure 3:
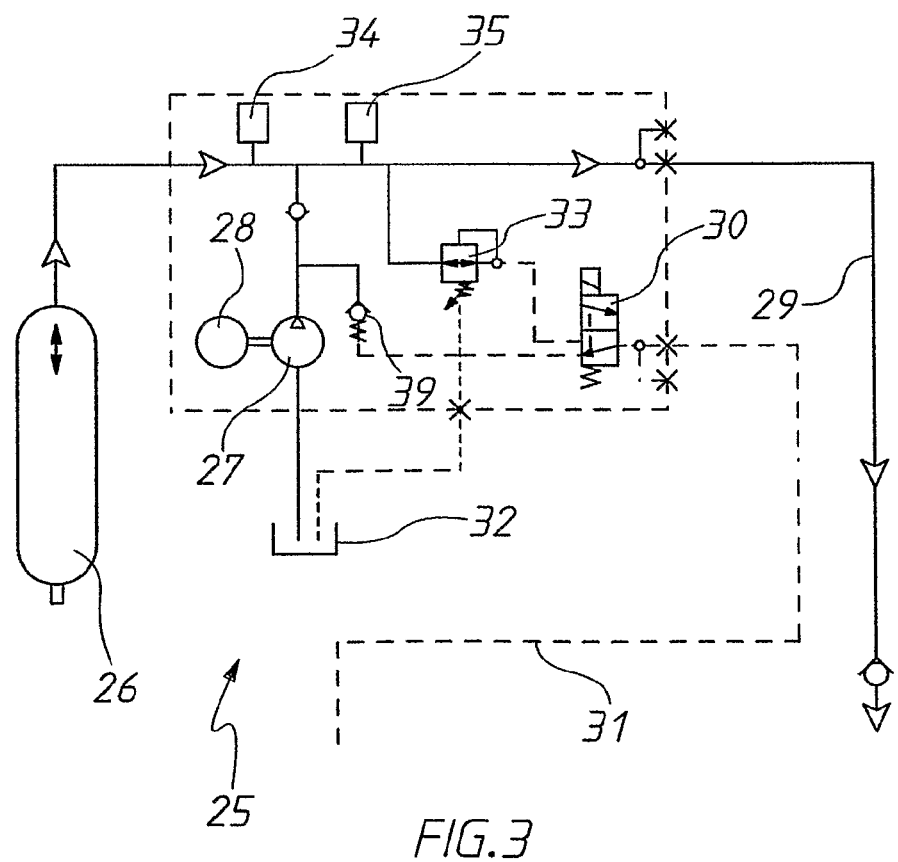

Circuit Ready (FIG. 3)

When the reservoir 26 is charged the line 29 has sufficient pressure. Accordingly the motor 28 is turned off and therefore is generally inoperative.

Figure 4:
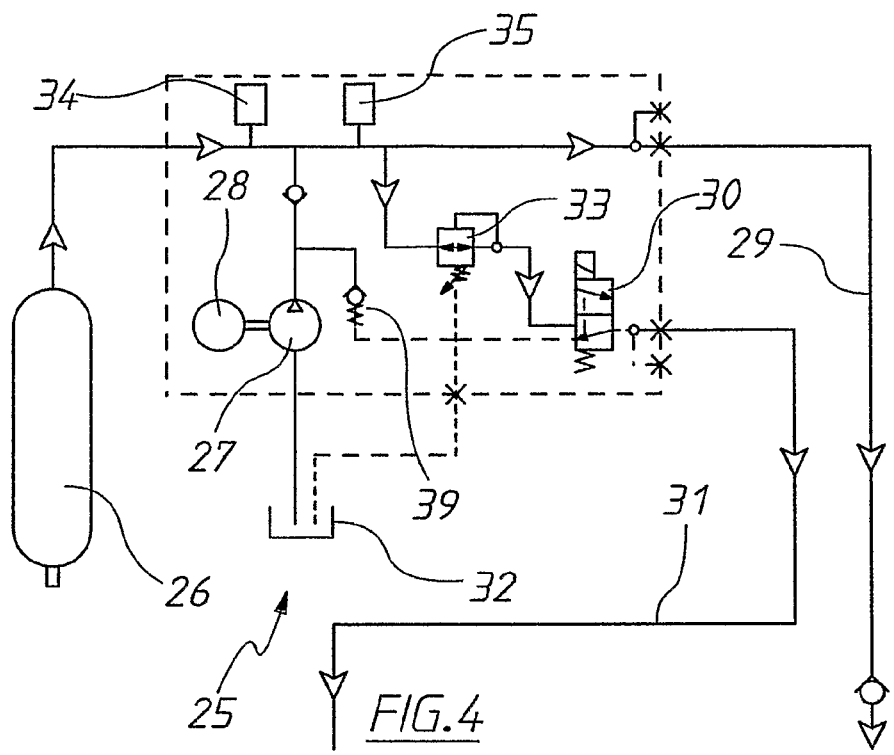

Clutch Engagement (FIG. 4)

When the clutch 13 drivingly connects the shaft 12 and gear 15, the valve 30 is operated to deliver hydraulic fluid under pressure from the line 29 to the line 31.

Figure 5:
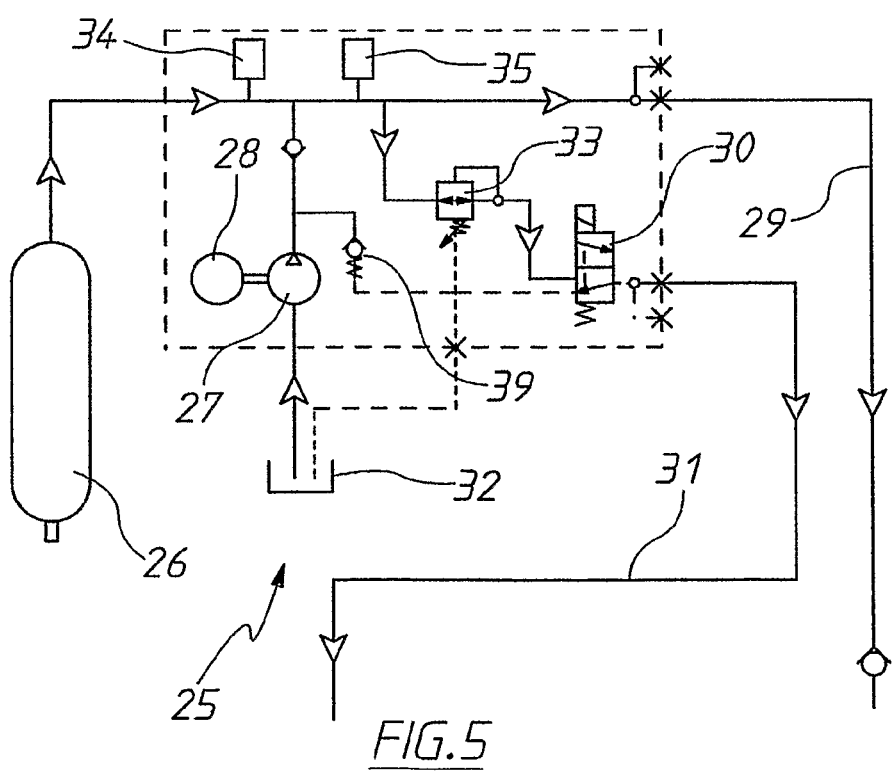

Clutch Steady State Operation (FIG. 5)

Once the clutch 13 is engaged, there is no further flow although pressure is maintained in the line 31 as well as line 29.

Figure 6:
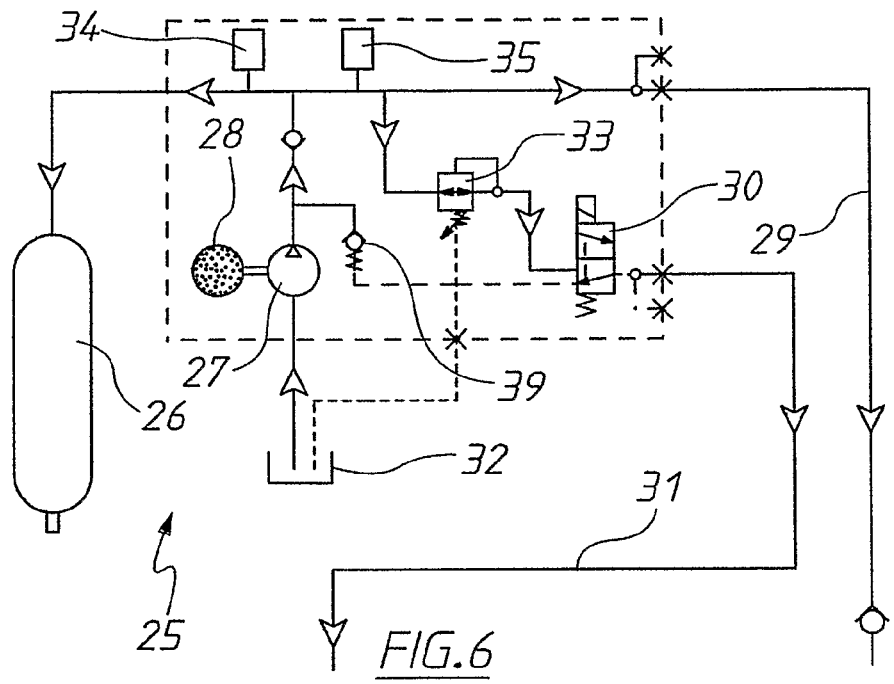

Reservoir Charge-Up (FIG. 6)

During operation of the above described assembly 10, should the pressure in the line 29 drop below a predetermined pressure, the switch 35 will cause operation of the motor 28 to drive the pump 27 to restore pressure in the reservoir 26 so that this pressure is available to the pump/motor 11 for the purposes of operating the actuator 19.

Figure 7:
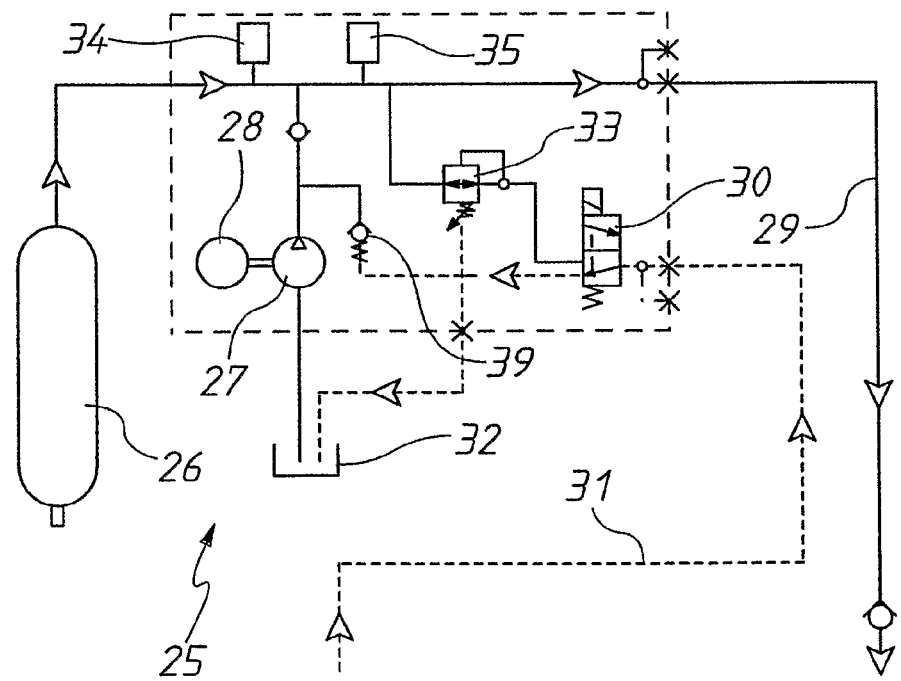

Clutch Disengagement (FIG. 7)

When the clutch 13 is to be disengaged, the valve 30 is operated so as to connect the line 31 to the tank 32. This drains pressure from the clutch 13 causing it to disengage the shaft from gear 15.

Figure 8:
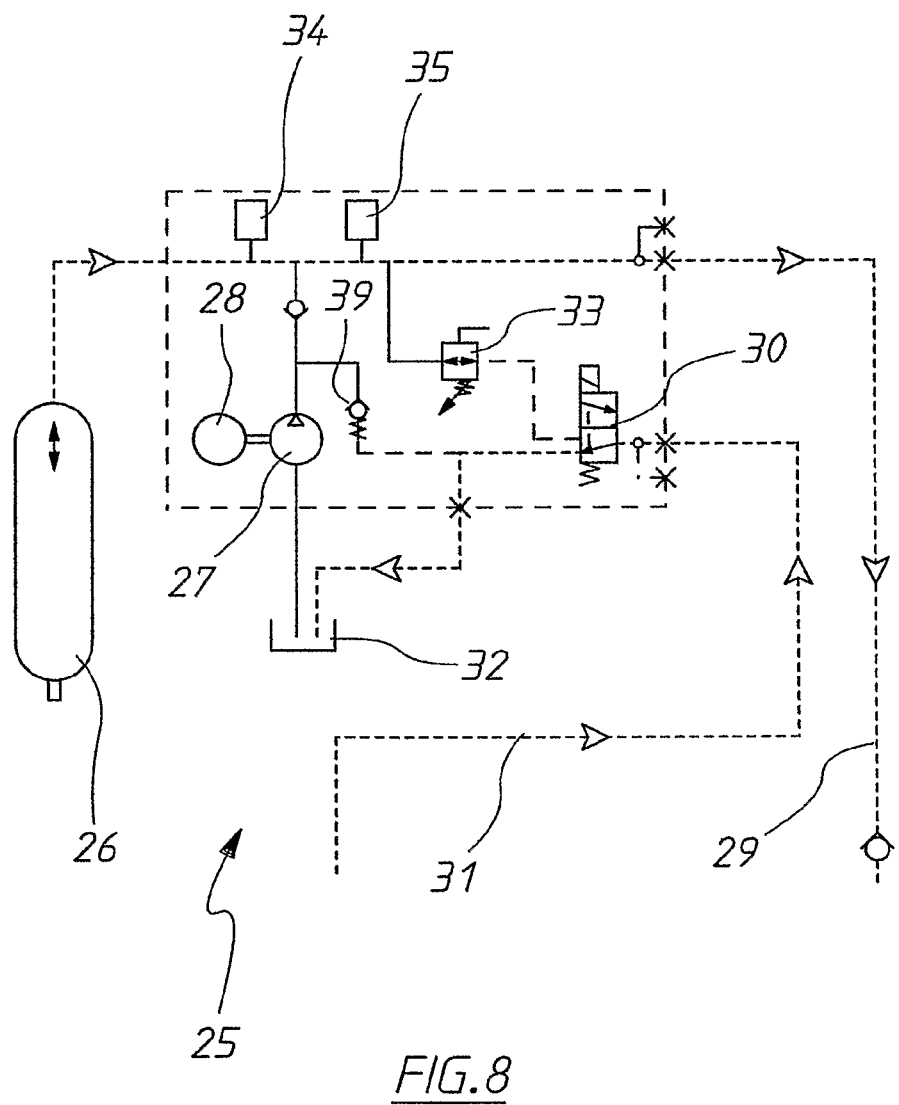

Shut Down (FIG. 8)

When the assembly 10 is to be inoperative, the valve 30 will revert to a configuration at which the line 31 is connected to the tank 24, thereby draining hydraulic fluid from the clutch 13. An overall control system will also deactivate the motor 28, to position the plate 18 prior to or during clutch engagement to address the issue of is capturing maximum energy from the motor lorry decelerating or returning capturing energy more rapidly to the motor lorry accelerating.

In the above preferred embodiment, the variable volume pump is a variable angle swash plate pump 11. Other variable volume pumps may be employed, for example pumps that employ electronically controlled valves to change the pump capacity.

The above described preferred embodiment has the advantage of providing the pump/motor 11 with hydraulic fluid under pressure to position the plate 18 to address the issue of capturing maximum energy from the motor lorry decelerating.

The invention claimed is:

1. A regenerative drive system for a motor vehicle, said drive system including:
    a main accumulator;
    a pump/motor to deliver and receive hydraulic fluid to/from the main accumulator, said pump/motor having a variable capacity, a mechanism to change said capacity, and a control hydraulic circuit to provide control hydraulic fluid under pressure to be used in controlling the mechanism, the circuit including:
    a first hydraulic line connected to the pump/motor to deliver the control hydraulic fluid under pressure to said mechanism;
    a control accumulator to receive hydraulic fluid under pressure and connected to said line to provide said control hydraulic fluid under pressure for delivery to the pump/motor;
    a control pump connected to the control accumulator to deliver hydraulic fluid under pressure thereto;
    a control motor drivingly connected to the control pump to drive the control pump to produce the hydraulic fluid under pressure;
    a switch operatively associated with the motor to activate the motor when said system is operative and pressure in said line falls below a predetermined pressure; and
    wherein said system further includes:
    a second hydraulic line connecting the main accumulator and pump/motor, and communicating with said first line so that pressure from said second line can be delivered to said first line; and
    a one-way valve preventing hydraulic fluid flowing from said first line to said second line.

2. The system of claim 1, wherein said pump/motor is a variable angle swash plate pump and said mechanism is a swash plate.

3. The system of claim 1, wherein said drive system further includes a drive assembly to be drivingly associated with a drive train of a motor vehicle, said drive assembly including:
    a first member to be drivingly associated with the drive train;
    a clutch operatively associated with the pump/motor and first member so that when engaged the first member is driven by or drives the pump/motor, while when disengaged the pump/motor and first member are drivingly isolated; and wherein
    said hydraulic circuit is operatively associated with said clutch to cause engagement and disengagement thereof.

* * * * *